Dec. 17, 1935.      R. K. LEE      2,024,459
DRIVING MECHANISM
Filed July 27, 1933
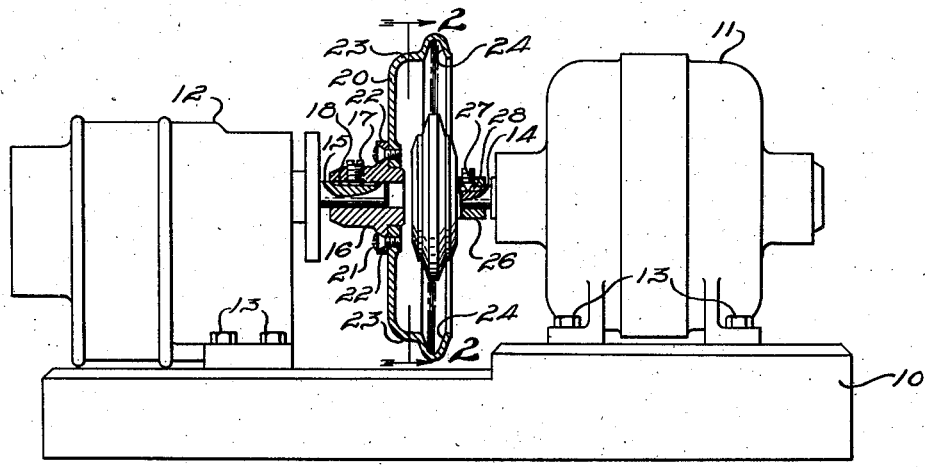
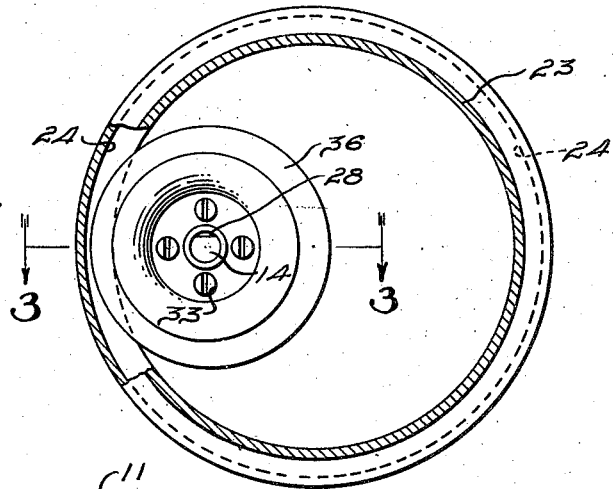
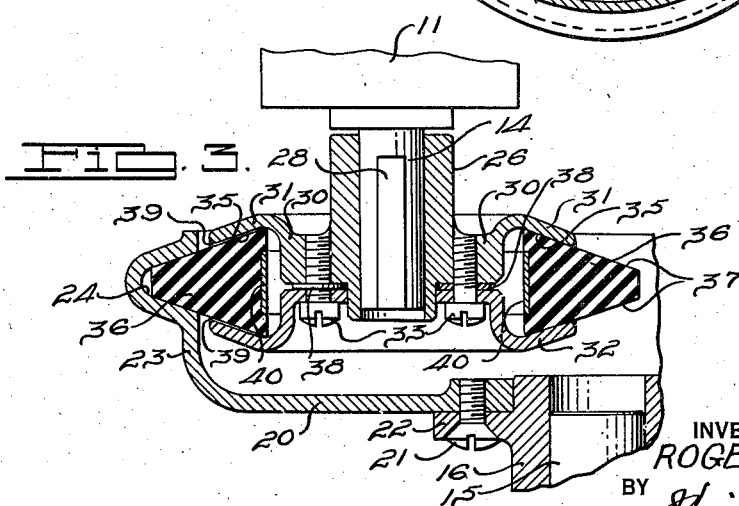
INVENTOR
ROGER K. LEE.
BY
ATTORNEY Patented Dec. 17, 1935

2,024,459

UNITED STATES PATENT OFFICE 2,024,459

DRIVING MECHANISM

Roger K. Lee, Highland Park, Mich., assignor to Chrysler Corporation, Detroit, Mich., a corporation of Delaware Application July 27, 1933, Serial No. 682,361

3 Claims. (Cl. 74—206)

This invention relates to drive connections and more especially to internal and external types of friction drive connections.

Some of the objects of this invention are: to provide improved means for transmitting power from a driving to a driven element; to provide a simple and efficient drive connection which is quiet in operation; to provide a drive connection comprising a small number of simply and economically constructed parts; to provide a drive connection having easily replaceable parts; to provide a drive connection which transmits little or no vibration during operation from a driving to a driven element and vice versa; to provide a driving connection which is easily assembled and practically self adjusting during operation; to provide a drive connection including a resilient member and one drive element which affords contact over a considerable area with the other drive element; to provide a rigid backing member for such resilient element to insure proper positioning of the same; and to provide means for detachably mounting the resilient member in concentric relation on one of the drive elements.

Other objects and advantages will become apparent from the following description and appended claims.

For the purpose of illustrating the genus of the invention, a typical concrete embodiment is shown in the accompanying drawing, in which:

Fig. 1 is a side elevation with parts broken away and in section, of driving and driven units connected by a drive mechanism according to the present invention;

Fig. 2 is an enlarged section on line 2—2 of Fig. 1; and

Fig. 3 is a section on a still more enlarged scale, taken on the line 3—3 of Fig. 2.

Referring to the drawing, 11 and 12 designate driving and driven units secured to a suitable base 10 by means of bolts 13. The shafts 14 and 15 of these units are arranged in substantially parallel but eccentric relation and preferably one or both of the units is secured to the base 10 so that the unit or units may be moved laterally to adjust the distance between the axes of the shafts.

The driving connection between the shafts 14 and 15 constitutes the subject-matter of this invention, and it is to be understood that either of the units 11 or 12 may be the driving or driven unit. The driving connection comprises a hub 16 secured to the shaft 15 in axially adjusted position by means of a set screw 17 and a flat portion 18 formed on the shaft 15. By virtue of this construction the hub 16 may be adjusted axially of the shaft 15 toward or away from the unit 11. A drum 20 is secured to the hub 16 by means of screws 21 projecting through flanges 22 formed on the hub 16. The drum 20 is provided with a laterally directed flange 23 in which is formed a radially inwardly directed and inwardly diverging groove 24 arranged concentric with respect to the axis of the shaft 15.

A hub member 26 is non-rotatably fixed to the shaft 14 of the unit 11 by means of a set screw 27 cooperable with a flat portion 28 formed on the shaft 14. The flat portion 28 is extended along the shaft 14 so that the hub 26 may be adjusted axially along the shaft 14 toward or away from the unit 12. The hub portion 26 is provided with an integral annular enlarged portion 30 having a flanged portion 31 directed outwardly and then inwardly at an angle with respect to a line extended radially outwardly from the axis of shaft 14 and through the center of the flange portion 30. A similarly formed flange portion 32 is detachably secured to the opposite portion of the flange portion 30 by means of screws 33 so that the flange portions 31 and 32 form a radially outwardly converging groove portion 35. The groove portion 35 is adapted to receive a resilient element 36 in the form of a rubber annulus or inverted V belt. The resilient annular member 36 has outwardly converging walls 37 complementary to the walls of the groove 24 of drum 20.

A rigid backing member 40 may be embedded in the annulus 36 and is in itself in the form of an annulus or hoop member of metal or other desired rigid material. The backing member 40 may be cemented, vulcanized or otherwise securely bonded to the annulus 36. The backing member 40 prevents inward buckling of portions of the annulus 36 and aids in positioning the annulus 36 in concentric relation with respect to the axis of the shaft 14 when the annulus is secured within the clamp members provided by the flanges 31 and 32 and the screws 33.

In the operation of the drive connection the portion of the annulus 36 containing the backing member 40 is secured within the clamp provided by the flanges 31 and 32 and the screws 33 and the shafts 14 or 15 or both are adjusted so that the annulus 36 has its outer periphery disposed in the groove 24 of the drum 20. The distance between the axes of the shafts 14 and 15 is adjusted so that the outer periphery of the annulus 36 will have the desired frictional engagement with the walls of the groove 24, and so that power may be transmitted from the unit 11 to the unit 12 or vice versa. The shafts 14 and 15 may be adjusted so that the annulus 36 exerts the desired pressure against the groove portion 24 displacing the material of the annulus 36 so that contact between the annulus and the groove 24 extends over a considerable area, which area is greater by virtue of the internal external disposition of the annulus and drum than would be the case of external peripheral contact between both of these elements. The resilient annulus 36 affords a silent drive between the driving and driven units and minimizes the transmission of vibration from one unit to the other. Due to the resiliency of the annulus 36 close adjustment of the distance between the axes of the shafts 14 and 15 is not required.

In case of wear of the annulus 36 it may be replaced by an annulus including an embedded backing ring 40 as a unit by removing the screws 33 and the flange 32 and then clamping a new annulus and backing member between the flanges 31 and 32 by means of the screws 33. Washers 38 may be positioned between the flange portions 31 and 32 so that the rubber annulus is not tightly clamped between the flange portions but free to be shifted to eccentric positions with respect to the axis of the shaft 14. With the annulus 36 loosely mounted between the flange portions 31 and 32 and the annulus engaged with the walls of the groove 24, there will be a slight clearance between the walls 37 of the annulus and the flange portions 31 and 32 adjacent the engaged portion of the drum 20, as indicated at 39. The diametrically opposite portion of the annulus 36 is, however, wedged between the diametrically opposite portions of the flange portions of the clamping flanges. The backing ring 40 embedded in the annulus 36 not only maintains the shape of the annulus but prevents the lateral walls of the annulus from being materially compressed or buckled inwardly so that frictional engagement is maintained over a considerable area of the clamping flanges and the rubber annulus. With this construction, end play of either or both shafts 14 and 15 will not cause excessive cutting or wear of the annulus 36 since the clearance 39 can be made greater than the end play occurring in the driving and driven shafts. During operation of the device including the washers 38, the annulus 36 rotates about an axis eccentric with respect to the shaft 14 and disposed between the axes of the shafts 14 and 15, the annulus contacting the groove 24 but not the adjacent portions of the clamping flanges 31 and 32. The diametrically opposite portion of the annulus, however, is wedged between the clamping flanges insuring the drive between the clamping flanges and the annulus without excessive creeping of the latter.

Since many changes could be made in the above construction, and many apparently widely different embodiments of this invention could be made without departing from the scope thereof, it is intended that all matter contained in the above description or shown in the accompanying drawing shall be interpreted as illustrated and not in a limiting sense.

I claim:

1. In an internal-external drive connection, driving and driven members including an annulus of substantially V-shaped section and of resilient material, a rigid backing ring secured to said annulus at one periphery thereof, clamping means for loosely securing the portion of said annulus which includes the backing ring to one of said members, and an annular grooved portion in the other member for engaging a portion of said annulus and forcing the diametrically opposite portion of the annulus into frictional engagement with said clamping means.

2. In an internal-external drive connection including driving and driven members, an outwardly coverging rubber annulus, a rigid backing ring embedded in the inner periphery of said annulus, converging annular clamping flanges secured to one of said members for loosely receiving the portion of said annulus which includes the backing ring therebetween and an inwardly directed and inwardly diverging annular grooved portion adapted to engage a portion of the outer periphery of said annulus and force a diametrically opposite portion of the annulus into frictional engagement with said clamping flanges.

3. A driving connection including driving and driven members, a resilient annulus shiftably mounted on one of said members and normally held in non-concentric relationship with respect thereto, said annulus having a portion thereof in frictional engagement with the other member and adapted to be forced into frictional driving engagement with said first named member over a portion thereof substantially diametrically opposite to the frictionally engaged portion of said other member.

ROGER K. LEE.